United States Patent [19]

von Bennigsen-Mackiewicz et al.

[11] 4,269,548

[45] May 26, 1981

[54] APPARATUS FOR MEASURING AND CONTROLLING FLOW OF PULVERULENT MATERIAL

[76] Inventors: Andreas von Bennigsen-Mackiewicz; Christoph von Bennigsen-Mackiewicz, both of 3211 Banteln, Hannover, Fed. Rep. of Germany

[21] Appl. No.: 6,346

[22] Filed: Jan. 25, 1979

[30] Foreign Application Priority Data

May 16, 1978 [DE] Fed. Rep. of Germany ....... 2821372

[51] Int. Cl.³ ............................................. B65G 53/66
[52] U.S. Cl. ........................................ 406/25; 406/32; 406/109; 406/120
[58] Field of Search ...................... 406/1, 3, 23, 24, 25, 406/32, 33, 39, 109, 120; 177/154

[56] References Cited

U.S. PATENT DOCUMENTS

| | | |
|---|---|---|
| 2,221,741 | 11/1940 | Vogel-Jorgensen .................. 406/25 |
| 3,378,310 | 4/1968 | Christensen ..................... 406/109 X |
| 3,424,501 | 1/1969 | Young ................................. 406/109 |
| 4,005,908 | 2/1977 | Freeman ............................... 406/25 |

FOREIGN PATENT DOCUMENTS

291855  1/1971  U.S.S.R. ................................... 406/25

*Primary Examiner*—Jeffrey V. Nase
*Attorney, Agent, or Firm*—Hill, Van Santen, Steadman, Chiara & Simpson

[57] ABSTRACT

A vehicle for receiving, transporting, measuring and delivering weighed amounts of flowable pulverulent material, such as wheat flour, has a blower which draws the material from a storage container to a selected one of a plurality of measuring containers where it is weighed and the weighed contents are then emptied by the blower for delivery to the customer, such as a bakery. A plurality of measuring containers are provided so that one may be filling while another is discharging. The vehicle is automated with sensing switches and valves regulating the operation.

10 Claims, 6 Drawing Figures

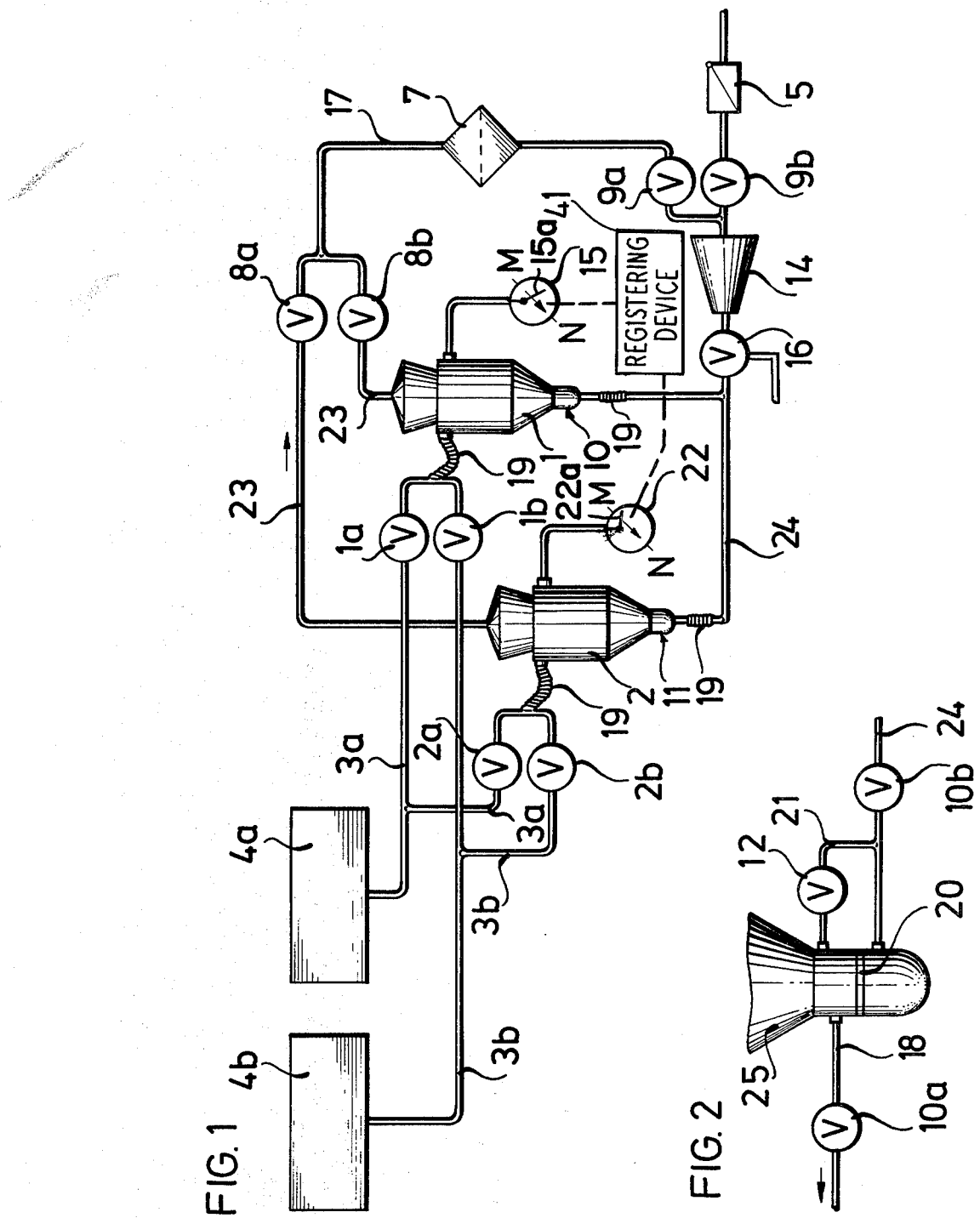

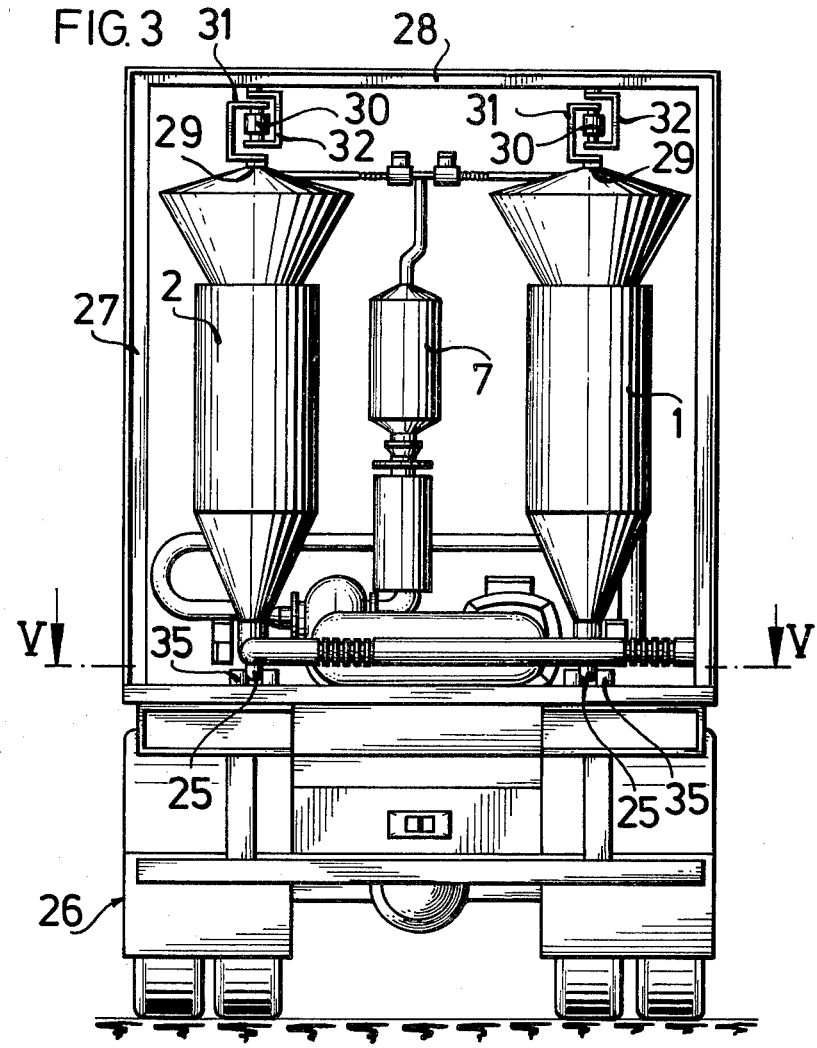
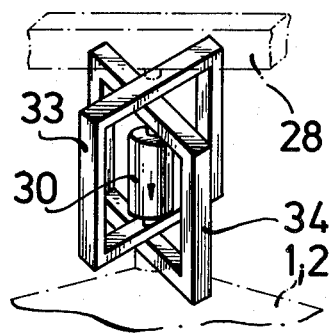
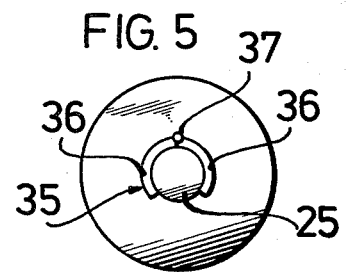

APPARATUS FOR MEASURING AND CONTROLLING FLOW OF PULVERULENT MATERIAL

BACKGROUND OF THE INVENTION

Field of the Invention

The invention relates to an apparatus with the output of measured quantities of fine-grained pulverulent material, particularly wheat flour, from at least one transportable storage bin, a scale, a measuring container, an outlet arrangement, and a conveyor conduit arranged between the storage bin and the measuring container. The conveyor conduit is acted on by vacuum applied on the measuring container to effect its filling.

Heretofore with the known arrangement of this type, only a single measuring container was provided, along with a storage bin and the related conveyor devices, and installed on a transportable vehicle. This known arrangement was utilized for, among other things, the delivery of measured quantities of flour to bakeries.

The disadvantage with this known arrangement is that the delivery of the flour is slow because of the necessity to measure the amount delivered. During this weighing and measuring period, there can be no transfer from the storage bin to the measuring container, nor can there be a delivery from the measuring container to the customer. Both of these drawbacks prolong the delivery time. Accordingly, as far as the utilization of the vehicles and personnel are concerned this is inefficient and leads to higher costs.

SUMMARY OF THE INVENTION

The object serving as basis for the invention is to provide an arrangement of the type mentioned which will appreciably increase the feed output and decrease the delivery time.

To shorten the down-delivery time, this invention provides a plurality of preferably two scales with measuring container attachable interchangeably to a conveyor conduit leading from a storage bin so that, during the filling period of the one measuring container, the extraction of the pulverulent material from the other measuring container takes place.

With this arrangement, the conveyor output or feed performance, as compared with the known arrangement, may be doubled with only a minor extra expenditure. This then shortens the delivery periods by half.

The simultaneous filling of one measuring container while evacuating the other measuring container makes it possible to keep the containers relatively small in spite of the high output. Thus, a relatively small and compact manner of construction of the entire arrangement is provided as compared with the known arrangement which operates with a relatively large measuring container, even though the invention utilizes a plurality of measuring containers.

The arrangement according to the invention, compared with the known arrangement, has an additional advantage in that during the evacuation operation of the one measuring container and at the end of the filling operation of the other container, pressure may be built up in the filled container for the following evacuation of this container. In this manner, in addition to the shortening of the delivery periods to half compared with the known arrangement, a further advantage as to time may be attained because before each evacuation operation, the pressure in the measuring container must first be built up.

It is indeed possible, for the production of the vacuum for the purpose of the filling of the measuring containers and for the production of the positive pressure for their evacuation, to install two blowers, of which the one supplies the excess pressure and the other the vacuum. However, it is particularly advantageous if the vacuum conduit of each measuring container is attachable interchangeably on the suction side, and the outflow arrangement of each measuring container interchangeably on the pressure side, of a blower common to both measuring containers. In this manner, one in the same blower is utilized for both the filling operation as well as for the evacuation operation, thereby saving space as well as equipment costs. Also, because both the intake and exhaust of the blower are utilized, neither is wastefully vented to the outside and the energy expended is thereby conserved.

For the control of the changeable activation of the plurality of measuring containers, it is particularly advantageous if each measuring container is alloted at least one sensing device which controls the changeable activation of the measuring container, as thereby a very exact control is possible. A particularly advantageous and simple construction results if each sensing device has a zero position and a maximum position, whereby the evacuation operation of the particular measuring container is activated, if its sensing device is in the maximum position and the sensing device of the other measuring container is in the zero position. Thus the evacuation of a particular filled container first begins when the other container is completely evacuated, as in general, the filling operation proceeds more rapidly than the evacuation operation. Conversely, it is an advantage if in addition, care is taken that the evacuation operation is terminated when the related sensing device of the measuring container reaches the zero position and when the sensing device of the other measuring container is in the maximum position. This prevents both measuring containers from being evacuated simultaneously.

Suitably the maximum and zero positions of the sensing devices are formed by means of adjustable contacts, whereby these contacts may be constructed as contactless switches. These contacts may then be acted on by means of a rotating pointer or indicator or the like of the sensing device.

In order, during the duration of the evacuation operation of one container after termination of the filling operation of another container, to effect a build-up of pressure in the filled container, it is advantageous if the particular outlet arrangement has an extraction pipe with an extraction conduit attached to the pressure conduit coming from the blower, as well as a by-pass conduit leading from the pressure conduit into the interior of the measuring container and serving for the build-up of pressure. In order to be able to adapt the air flow to the particular circumstances, it is advantageous to have the by-pass conduit provided with an adjusting valve, preferably controllable manually. The pressure conduit suitably opens into the extraction pipe below an air permeable diaphragm, which serves for the fluidization of the pulverulent material within the extraction pipe.

In order to be able to undertake the above described interchangeable activation of the measuring containers in a simple manner, it is advantageous if in the conveyor conduit as well as in the vacuum conduit and in the outlet arrangement of each measuring container, valves are arranged which are controllable by means of the sensing devices.

Further, it is advantageous if in the suction conduit, at least one valve with a relief flap is connected in series with the blower, through which valve, upon closure of the suction conduit, air may be sucked in for the further feed of air into the pressure conduit. Thereby the single blower after termination of the filling operation of one measuring container may operate further in the described manner in order to terminate the evacuation operation of another measuring container.

It is furthermore of advantage if on the pressure side a further valve is connected in series with the blower which insures during the filling operation letting the blower air occurring on the pressure side blow outwardly.

The valves arranged in the individual conduits may be constructed as electromagnetic valves, as the latter permit of being easily and simply controlled.

In the suction conduit, in addition, a filter may be arranged, in order to prevent an overflow of sucked up particles into the blower and on into the pressure conduit.

The arrangement according to the invention permits operation in the simple manner by means of normal mechanical scales, or alternatively with more expensive weighing arrangements such as pressure measuring cans or the like. However, in both cases, it is particularly advantageous to combine both scales in a common framework or particularly in a common housing on the transportable vehicle.

The utilization of pressure measuring cans may be advantageous because pressure measuring cans may be employed for the delivery of the corresponding switch impulses to the sensing devices. Upon a utilization of pressure measuring cans, the individual measuring containers may be suspended on a framework bracing the container, and indeed on a transverse member engaging on the container, whereby, in a known manner, the pressure measuring can is connected intermediately. In addition, an apparatus may be provided which, during movement of the vehicle while transporting, for example, rigidly fixes the measuring container to the transportable vehicle to prevent movement of the measuring container with possible damage to the weighing arrangement. This apparatus may, in an advantageous manner, consist of a clamping apparatus provided with two one-sided levers pivotal about an axis, said clamping device embracing the lower end of the extraction pipe.

In order to allow some movement of the measuring containers during use, the latter are suitably attached through flexible intermediary members to the individual conduits.

Suitably a registering apparatus is provided which registers the number of measuring containers evacuated and their particular weight, also visually indicating the same.

Finally, several storage bins may be provided, which are attachable consecutively to the measuring containers. In this connection, it is suitable if each storage bin is provided with branch conduits which lead to the measuring containers, whereby each of these branch conduits is correlated with valves controllable by the sensing devices, so that a change solely requires the reversal from the one valve to the next, when, for example, the first storage bin is evacuated.

BRIEF DESCRIPTION OF THE DRAWINGS

FIG. 1 is a schematic view of an embodiment of the apparatus according to the invention.

FIG. 2 is a schematic view of an embodiment of the outlet arrangement for a measuring container of the apparatus according to FIG. 1.

FIG. 3 is a rear view of a transporting vehicle equipped with the apparatus according to the invention.

FIG. 4 is a perspective view of an arrangement of a pressure measuring can.

FIG. 5 is a cross-sectional view along line V—V of FIG. 3 showing a clamping apparatus for restraining the lower end of the extraction pipe of a measuring container.

DESCRIPTION OF THE PREFERRED EMBODIMENTS

Figure 6:
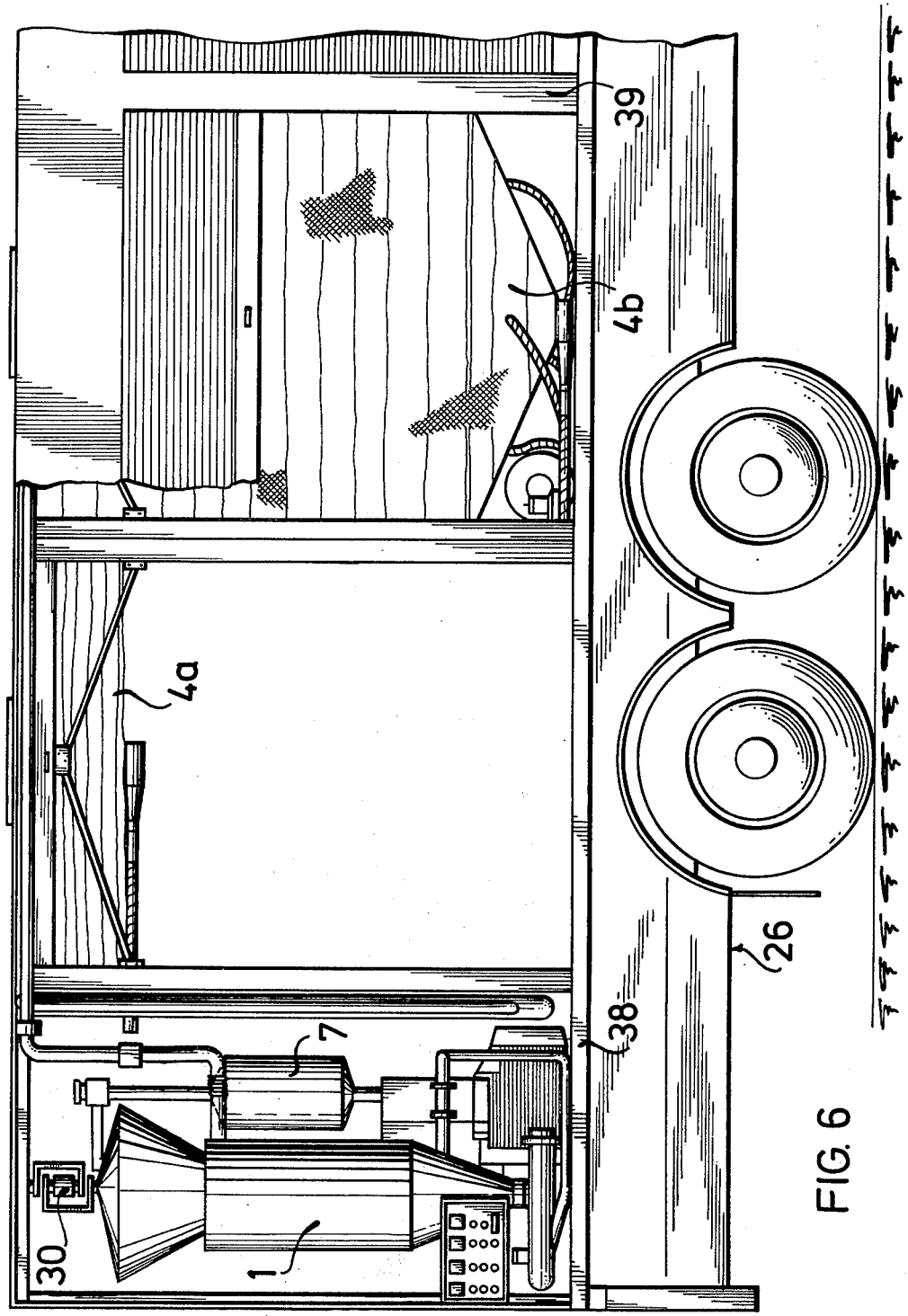
FIG. 6 is a side view of a transporting vehicle equipped with an apparatus according to the invention.

According to FIG. 1, two measuring containers 1 and 2 are provided, which are attached to conveyor conduits 3a and 3b to storage bins 4a and 4b, whereby valves 1a and 1b or 2a and 2b respectively are arranged in the conveyor conduits. Each measuring container is attached through individual vacuum conduits 23 with valves 8a and 8b to a common suction conduit 17, which has a filter 7. Furthermore, each measuring container has an outlet arrangement 10 or 11, respectively, which is attached to a pressure conduit 24. The use of multiple measuring containers is contemplated within this invention, and the invention should not be viewed as limited by showing only the two measuring containers 1 and 2. Both the suction conduit 17 as well as the pressure conduit 24 are acted on by a common or single blower 14, which is attached on the suction side of the conduit 17 and on the pressure side to the conduit 24, whereby on the suction side two valves 9a and 9b are provided in the conduit 17, of which valves, the valve 9a serves for the closure of the suction conduit 17 and the valve 9b for the opening of the suction side of the single blower 14 through a relief flap valve 5 outwardly when valve 9a is closed. Furthermore, on the pressure side, a valve 16 is correlated with the single blower 14, said valve 16, upon closed outlet arrangements, permits the blower air occurring on the pressure side to flow off outwardly.

Each measuring container is in addition provided with a sensing device 15 or 22, respectively, which serves for acknowledging the filler quantities and, at the same time, for controlling the above named valves provided in the arrangement. The sensing devices 15 or 22, respectively, have a zero position N and a maximum position M, whereby these positions may be formed by means of adjustable contact, contactless switches, or the like indicated at 15a and 22a.

The measuring containers are attached through flexible intermediary members 19 to the conveyor conduit or to the pressure conduit, respectively.

FIG. 2 shows in a schematic disclosure an embodiment of an outlet arrangement. According thereto, on both sides of an extraction pipe 25 of the particular measuring container 1 or 2, valves 10a or 10b, respectively, are provided, which serve for the opening or the closure, respectively, of the particular outlet arrangement.

Further, on both of the extraction pipes 25 of the measuring containers 1 and 2, there is provided a bypass conduit 21 with an adjusting valve 12, so that a part of the air for the purpose of the build-up of pressure may flow into the measuring container. The pressure build-up is necessary in order to make possible an extraction through an extraction conduit 18. The air coming in through the pressure conduit 24 enters below a diaphragm 20, which is air permeable and serves for the fluidization of the pulverulent material within the extraction pipe 25.

The by-pass conduit 21 with the adjusting valve 12, which is actuatable manually, allows, depending upon the type of pulverulent material, the corresponding adjustment of the air current required in each case.

The method of operation of the described arrangement is as follows:

Upon commencement of the filling operation of, for example, the first measuring container 1, one of the valves 1a or 1b is open, and at the same time, the valves 8b and 9a are open. Upon an actuation of the blower 14, the resultant vacuum is applied through the vacuum conduit 23, entry into the measuring container 1 takes place through the open valve 1a or 1b. The filling operation now proceeds until the maximum contact M on the sensing device 15 is actuated, whereupon the valves 1a or 1b and 8b are closed. During the filling operation, the valve 16 is also open, in order to permit the blower air occurring on the pressure side to flow off outwardly. This exhaust valve 16 is likewise closed together with the valves 1a or 1b and 8b upon attainment of the maximum contact M on the sensing device 15.

Through the closure of the maximum contact M of the sensing device 15, in addition, one the valves 2a or 2b is opened as well as the pertaining valve 8a in the suction conduit 23, so that the second measuring container 2 may be acted on.

Now, in a corresponding manner, the second measuring container 2 may be filled. At the same time, with the opening of the valves 2a or 2b and 8a, the valves 10a and 10b correlated with the first measuring container 1, said valves being in the outlet arrangement 10 (compare FIG. 2), are opened; so that the extraction commences in the previously disclosed manner.

The filling of the second measuring container 2 and extraction from the first measuring container 1, however, starts only when the maximum contact M is closed on the sensing device 15 of the first measuring container 1, and at the same time the sensing device 22 of the second measuring container 2 is still in its zero position N.

The filling operation of the second measuring container 2 starts now in the described manner, and continues until its sensing device 22 reaches the maximum contact M likewise provided there and adjustable. The adjustment of the maximum contact M takes place depending upon the filling weight desired in each case. Upon attainment of the maximum contact M, the filling is interrupted in the described manner through closure of the valves 2a or 2b and 8a. In addition, the valve 9a is closed and the valve 9b is opened. Upon attainment of the maximum value and stabilization of the scale, the indicated value is registered by a registering device 41, which could consist of an electronic storage apparatus.

As in general, the filling operation proceeds more rapidly than the extraction operation, care must be taken that the extraction operation out of the measuring container 1 proceeds even after termination of the filling operation of the measuring container 2. This is attained by having the extraction operation out of the measuring container 1 be terminated when the sensing device 15 has reached the zero position N. Up to attainment of the zero position N, accordingly, the valves 10a and 10b of the outlet arrangement 10 remain opened, whereby the air is sucked up through the relief flap valve 5, and the valve 9b, and is conveyed into the pressure conduit 24.

After attainment of the zero contact N of the measuring and registering device 15, the outlet arrangement 10 of the measuring container 1 is closed. Furthermore, the valves 1a or 1b and 8b are again opened and finally the outlet arrangement 11 of the second container 2 is open, so that the cycle may begin in the same manner as before, except that now the measuring container 1 is filled and the measuring container 2 is evacuated.

If one of the storage bins in the present case, for example, the storage bin 4a is evacuated, then storage bin 4b is brought into service using the conveyor conduit 3b. Now the corresponding valves 1b or 2b are acted on, instead of the valves 1a or 2a upon the filling operation.

FIG. 3 shows the rear view of a transportable vehicle 26 equipped with the apparatus according to the invention, whereby here the two measuring containers 1 and 2 are suspended on a common framework 27 stiffening a housing, and indeed on a beam 28 overlapping the containers 1 and 2. Between the two measuring containers 1 and 2 is arranged the filter 7 (compare FIG. 1).

Between an upper mounting 29 of the measuring containers 1 and 2 and the beam 28 are connected intermediately pressure measuring cans 30 so that the filling weight of the containers is determined by the pressure measuring cans and may be correspondingly indicated. With the embodiment by way of example according to FIG. 3, for this purpose the pressure measuring cans are provided on one side with overlapping semi-frames 31 and 32, which receive between them the pressure measuring can 30.

A modified embodiment for this is shown in FIG. 4. In contrast to the embodiment according to FIG. 3, here the pressure measuring can 30 is overlapped by two complete frames 33 and 34 arranged preferably at right angles in plan view.

As is further apparent from FIG. 3, the securing of the transport to the extraction pipe 25 with the particular measuring container 1 and 2 is fixed by means of a safety apparatus shown here as a clamping apparatus 35.

As is apparent from FIG. 5, the clamping apparatus may consist of two levers 36 swingable on one side about an axis 37, said levers 36 embracing the lower end of the extraction pipe 25 in fixed condition.

A registering device 41 is provided which registers the number of measuring containers evacuated, and their particular weight. Such indication may be in writing or it may be both written and by some visual expression.

FIG. 6 shows the transportable vehicle 26 according to FIG. 3 in side view and permits noting the correlation of the two storage bins 4a and 4b with the measuring containers 1 and 2 arranged on the rear end of the vehicle. As further apparent from FIG. 6, the storage bins 4a and 4b consist particularly of flexible material bags and are constructed to expand to their full height when full and to collapse and be drawn to the top of the containers when evacuated.

From FIG. 6, it is further apparent that the storage bins 4a and 4b together with the two scales formed by means of the measuring containers 1 and 2 are, arranged on a common base plate 38, which thereby forms a part of the common housing 39 and supports the same.

Although various modifications may be suggested by those versed in the art, it should be understood that we wish to embody within the scope of the patent warranted hereon, all such embodiments as reasonably and properly come within the scope of our contribution to the art.

We claim as our invention:

1. A transportable device for delivering measured amounts of finegrained bulk material comprising: at least one portable silo container, a plurality of measuring containers, pneumatic charge and discharge means connected to each said measuring container, a supply line pneumatically connecting said silo container to each of said measuring containers, first valve means in said supply line for selectively communicating said measuring containers with said silo container for charging said measuring containers with bulk material, a blower having a suction side connected to each measuring container for pneumatically drawing said bulk material thereto through said supply line, each discharge means including an extraction nozzle having an extraction line connected to the pressure side of said blower and a bypass line with a control valve leading from the pressure side of the blower into the interior of the measuring container for creating interior pressure in said measuring container after filling thereof, second valve means interconnected between said blower suction side and said measuring containers for regulating the suction in each measuring container, said blower further having a pressure side connected to said discharge means of each measuring container, an air-permeable membrane disposed in said extraction nozzle downstream of the connection with said pressure side of said blower, third valve means interconnected between said pressure side and said blower and each said discharge means for regulating the discharge of said measuring containers, a scale connected to each measuring container for measuring the weight of the material therein, a control means connected to each scale for monitoring the measurements thereof, said control means having an adjustable zero weight threshhold and an adjustable maximum weight threshhold, said adjustable zero threshhold triggering charging of a respective measuring container when attained and said adjustable maximum threshhold triggering discharge of a respective measuring container when attained, said control means connected to each of said first, second and third valve means for cooperatively coordinating operation thereof whereby charging of one of said measuring containers takes place only simultaneously with discharge of another of said measuring containers.

2. The device of claim 1 wherein said control means operates said third valve means during the emptying operation of said one of said measuring containers for charging of said another of said measuring containers with pressure after filling thereof.

3. The device of claim 1 wherein said maximum and zero threshholds of the control means are determined by adjustable electrical contact-free switches.

4. The device of claim 1 wherein at least one valve with a relief flap is pre-connected to the blower at its suction side, through which relief valve air is drawn for forwarding to the pressure side upon closing of the suction side of said blower.

5. The device of claim 1 wherein an outlet valve is connected to the blower on the pressure side, through which outlet valve the blower air arising on the pressure side after a filling operation of a measuring container is directed to the atmosphere.

6. The device of claim 1 wherein said scales are carried on a common frame which is disposed on a portable base plate surrounded by a housing enclosing said device.

7. The device of claim 1 wherein said scales are pressure measuring cans.

8. The device of claim 1 wherein said scales are pressure measuring cans and wherein said cans are carried on a common frame which is disposed on a portable base plate surrounded by a housing enclosing said device and wherein each measuring container is suspended beneath one of said pressure measuring cans.

9. The device of claim 8 including a safety apparatus for each measuring container which consists of a clamping apparatus provided with two levers pivotal on one side about an axis, said clamping apparatus closing to embrace a lower end of the measuring container whereby the measuring container may be secured during transport.

10. The device of claim 1 including a registering device connected to the control means whereby the number of evacuations and the weight of the amount evacuated from each measuring container may be recorded.

* * * * *